(12) United States Patent
Caps

(10) Patent No.: US 8,047,058 B2
(45) Date of Patent: Nov. 1, 2011

(54) METHOD AND DEVICE FOR DETERMINING THE GAS PRESSURE IN EVACUATED BODIES

(75) Inventor: Roland Caps, Kleinwallstadt (DE)

(73) Assignee: va-Q-tec AG, Würzburg (DE)

( * ) Notice: Subject to any disclaimer, the term of this patent is extended or adjusted under 35 U.S.C. 154(b) by 150 days.

(21) Appl. No.: 12/311,227

(22) PCT Filed: Sep. 26, 2007

(86) PCT No.: PCT/EP2007/008373
§ 371 (c)(1),
(2), (4) Date: Dec. 14, 2009

(87) PCT Pub. No.: WO2008/037451
PCT Pub. Date: Apr. 3, 2008

(65) Prior Publication Data
US 2010/0116061 A1 May 13, 2010

(30) Foreign Application Priority Data
Sep. 26, 2006 (DE) .................. 10 2006 045 471

(51) Int. Cl.
*G01M 3/34* (2006.01)
(52) U.S. Cl. .......................... 73/49.3; 73/52
(58) Field of Classification Search ............ 73/49.3, 73/52
See application file for complete search history.

(56) References Cited

U.S. PATENT DOCUMENTS

| | | | | |
|---|---|---|---|---|
| 4,205,551 A * | 6/1980 | Clifford et al. | ............... | 73/49.3 |
| 5,191,980 A * | 3/1993 | Boffito et al. | ............... | 206/524.4 |
| 5,345,814 A * | 9/1994 | Cur et al. | ............... | 73/49.3 |
| 5,750,882 A * | 5/1998 | Ludtka et al. | ............... | 73/38 |
| 7,400,999 B2 * | 7/2008 | Caps | ............... | 702/130 |
| 2005/0199067 A1 | 9/2005 | Caps | | |
| 2007/0051734 A1 * | 3/2007 | Kuhn | ............... | 220/592.27 |

FOREIGN PATENT DOCUMENTS

| | | |
|---|---|---|
| DE | 101 17 021 | 10/2002 |
| DE | 102 15 213 | 9/2003 |
| DE | 10348169 A1 * | 5/2005 |
| JP | 62 215194 | 9/1987 |

OTHER PUBLICATIONS

English Translation of DE10348169. Machine translation on Jul. 1, 2011 on http://worldwide.espcenet.com.*

* cited by examiner

*Primary Examiner* — Lisa Caputo
*Assistant Examiner* — Punam Roy
(74) *Attorney, Agent, or Firm* — Pandiscio & Pandiscio

(57) ABSTRACT

The invention is directed to a method and a system for using a thermal measurement method to determine the gas pressure in a vacuum element or in an evacuated body having an envelope and comprising on its exterior a flap delimited by two film faces that are joined together in the region of the free edge of the flap; the system according to the invention is characterized, on the one hand, by the fact that the space between the two film faces of the flap communicates with the space inside the envelope of the vacuum element and is at least partially filled with an open-pored, thin material layer, and, on the other hand, by a device for measuring the gas-pressure-dependent heat exchange coefficient of the flap at the location of the material layer; the invention also relates to the manner of operation of this measuring device.

58 Claims, 2 Drawing Sheets

METHOD AND DEVICE FOR DETERMINING THE GAS PRESSURE IN EVACUATED BODIES

The invention is directed to a method and a system for using a thermal measurement method to determine the gas pressure in a vacuum element or in an evacuated body, particularly comprising a film-like envelope on the exterior of which is formed a flap delimited by two film faces that are joined together in the region of the free edge of the flap. The purpose of the invention is particularly to measure the gas pressure in film-wrapped vacuum insulation panels from the outside.

Fast, thorough and sufficiently accurate determination of the gas pressure in film-wrapped vacuum insulation panels is an important prerequisite for successful production control and quality assurance of these products. There are several known methods of testing the gas pressure in vacuum insulation panels. The simplest is to observe the inflation of the envelope in response to an external gas pressure reduction, which is done by subjecting the vacuum insulation panels to a negative pressure, e.g. in a vacuum chamber. No modification of the vacuum insulation panel is necessary in this case. The disadvantages are the relatively elaborate nature of the equipment and the relatively long test duration, in the range of minutes. A minimum size for the test samples is also necessary so that the envelope film can lift itself free.

In another method, known from DE 102 15 213, a metal disk topped by a thin glass fiber mat is embedded in the vacuum insulation panel between the envelope film and the insulating core. The metal disk serves as a heat sink. A measuring head at elevated temperature is applied from the outside, and the transfer of heat through the glass fiber mat into the cold metal disk is measured. This heat transfer is a function of the gas pressure in the interior of the vacuum insulation panel. The measurement time with this method is around 10 seconds. A disadvantage of the method is that the embedded metal disk, which may be 2 mm thick, for example, protrudes from the surface in an objectionable manner. To prevent this, a suitable recess would have to be provided in the insulating core, which would increase the complexity of production to some extent. Moreover, in a stack of vacuum insulation panels the metal disks are not accessible for testing, since they cannot be placed on the exposed lateral edges.

The foregoing circumstances have given rise to the problem initiating the invention, i.e., to discover a method for measuring gas pressure that avoids these disadvantages.

This problem is solved, in a method of the above kind, by measuring the gas-pressure-dependent heat transfer coefficient from a flap disposed on the exterior of the vacuum element and formed by two film faces which are joined together in the region of the free edge of the flap and which delimit a gap that communicates with the space inside the envelope of the vacuum element and is at least partially filled with an open-pored, thin material layer, said heat transfer coefficient being measured at at least one point on the material layer.

The invention proceeds from the knowledge that heat transfer through a layer of porous material depends on the gas pressure in the pores or gaps of the layer of material, insofar as the transfer of heat by the material itself is as low as possible, since the air in the pores or gaps will then contribute substantially to thermal conduction. This boundary condition is satisfied by a great many nonmetals. The thermal conductivity $\lambda$ of the material of the open-pored, thin material layer should therefore be less than 100 W/mK, for example 50 W/mK or less, preferably 20 W/mK or less, particularly 10 W/mK or less, under some circumstances even 5 W/mK or less or as little as 2 W/mK or less.

A vacuum insulation panel is made by inserting an open-pored, pressure-resistant insulating core into a pouch made from a vacuum-tight envelope film. The process results in the formation of film flaps that protrude beyond the core and are closed with sealing seams. According to the invention, a thin matting can be inserted in these flaps, it being advantageous for the matting material to be in communication with the insulating core. This ensures that the same gas pressure will exist in the insulating core and in the measurement area of the matting. The matting must be uniform, at least in the region of the measurement area, and must preferably cover the surface evenly. Insofar as possible, no creases or folds should form in the measurement area.

In another production method, the insulating core is Wrapped in a single barrier film and one sealing seam is run across the top face of the panel. The two seams running transversely to that one are usually folded in close to the insulating core. It is also, however, possible to execute the folding in such a way that a flap protruding from the insulating core is formed at at least one of the two sealing seams. The thin test matting can also be inserted in this flap before the films are sealed. The matting in which the core is wrapped to protect it against dust can also be used, under some circumstances. The heat transfer coefficient of the flap or of the upper film/matting/lower film composite can be measured after the vacuum insulation panel is completed.

In the production of a vacuum insulation panel according to the invention, a thin layer of an open-pored heat-insulating material, e.g. a glass fiber matting, is placed in a protruding flap formed by the envelope film. After the vacuum insulation panel is completed, heat transfer at the flap is measured, and from this the gas pressure in the interior is derived. The size of the measurement area on the thin material layer should preferably be about 5-10 cm$^2$. The minimum size and surface shape of the thin material layer are to be selected accordingly.

The two films are thermally separated by the matting insert. A thermal resistance is created that depends on the gas pressure in the insert. If the cavity for the open-pored insert is in communication with the open-pored insulating core, the same gas pressure prevails in the insert as in the insulating core. If a matting is used that envelops the core, where appropriate, then this communication is automatically present.

The heat transfer through the film flap prepared in this way is preferably measured by means of two heat flow meters, each of which is attached to a metal temperature regulating plate. The film flap with the test matting is placed between the two heat flow plates with the metal plates regulated to different temperatures facing outwards. Since the heat capacities of the two envelope films of the flap and of the thin matting are low, the heat flow rapidly attains a steady state. The temperature difference and the average of the heat flow from the two heat flow meters are used to calculate the heat transfer coefficient of the film/test matting/film system. If the thickness of the test matting and the thermal resistance of the two films are known, the thermal conductivity of the test matting can also be calculated. From the known dependence of the thermal conductivity of the test matting on the gas pressure, which dependence can be determined via separate measurements of the test matting material, it is, in turn, possible to arrive at the gas pressure in the interior of the vacuum insulation panel.

An advantage of using two heat flow meters to measure the heat transfer coefficient is that according to the invention, after a brief settling time that depends on the unsteady thermal process of the test specimen, the average of the two sensors will very rapidly indicate the steady-state value. Testing times of 5 seconds or less are possible.

A test set-up in which there is only one heat flow meter is also theoretically conceivable, however.

The heat flow meter, which is normally only a few tenths of a millimeter thick, should be seated in a recess in the temperature regulating plate, thus resulting in the presence of a guard ring outside the heat flow meter. The upper surface of the heat flow meter, which is typically 20 mm in diameter, and the guard ring of the temperature regulating plate form a continuous surface. The guard ring serves to prevent heat from flowing away radially outward across the film in an uncontrolled manner. A square or rectangular arrangement can also, naturally, be chosen for measuring heat transfer in place of a radial arrangement.

To achieve good cooling, the cooler temperature regulating plate can also extend over a substantially greater area. It may, as appropriate, be cooled by a Peltier element or, in the simplest case, by a fan.

The temperatures of the two temperature regulating plates are measured by means of thermocouples or other temperature sensors. It is important for there to be a sufficiently large temperature difference between the two temperature regulating plates. This can be achieved, for example, by having one metal plate cooled to below or near ambient temperature and the second metal plate heated. Care should be taken, in such cases, to maintain the temperature at the most constant value possible by adequate regulation. The temperature difference between the temperature regulating plates can be up to 100 K.

Rather than being measured via a heat flow meter; the heat flow can also be measured on the basis of the electrical power expended to heat a temperature regulating plate through the test matting. A heating film is generally used to heat the temperature regulating plate. The heating film should in that case be surrounded by a sufficiently large thermal shield whose temperature is regulated to the same value.

In another variant of the invention, a heating film provided with a temperature sensor is placed between the vacuum insulation body and a folded-over film flap with a test mat inside it. A cooling plate is set on top of this arrangement. The heating film is heated to a predetermined temperature and the electrical thermal power input is measured. After unsteady heat flows have subsided, a constant thermal power is obtained, which, after being divided by the applied temperature difference, can be placed in a mathematical relationship to the internal gas pressure.

To obtain good thermal contact between the measuring heads or cooling bodies and the film flap, it is advantageous to equip each measuring head or cooling body with magnetic or magnetizable parts, so that they attract one another and compress the film flap between them under a defined pressure.

The described invention for measuring gas pressure is not, however, limited to film-wrapped, pressure-resistant vacuum insulation panels. Other vacuum elements which contain an open-pored material and on which gas-pressure-dependent heat transfer can be determined by the proposed method can also be equipped with a flap. Instead of a plastic film, the flap can be formed, for example, from a thin stainless steel film having a thickness of 50 µm or preferably 25 µm. The film flap can be connected to the volume of the vacuum element under test by welding and sealing techniques, by gluing, or via other vacuum-tight joints. The film flap consequently need not be made of the same material as the rest of the vacuum element.

The measurement method may, for example, be contemplated for use in food packaging technology. The method can be used to check the quality of the vacuum in vacuum-packed products.

Other features, details, advantages and effects based on the invention will become apparent from the following description of preferred embodiments of the invention and from reference the drawing. Therein:

Figure 1:
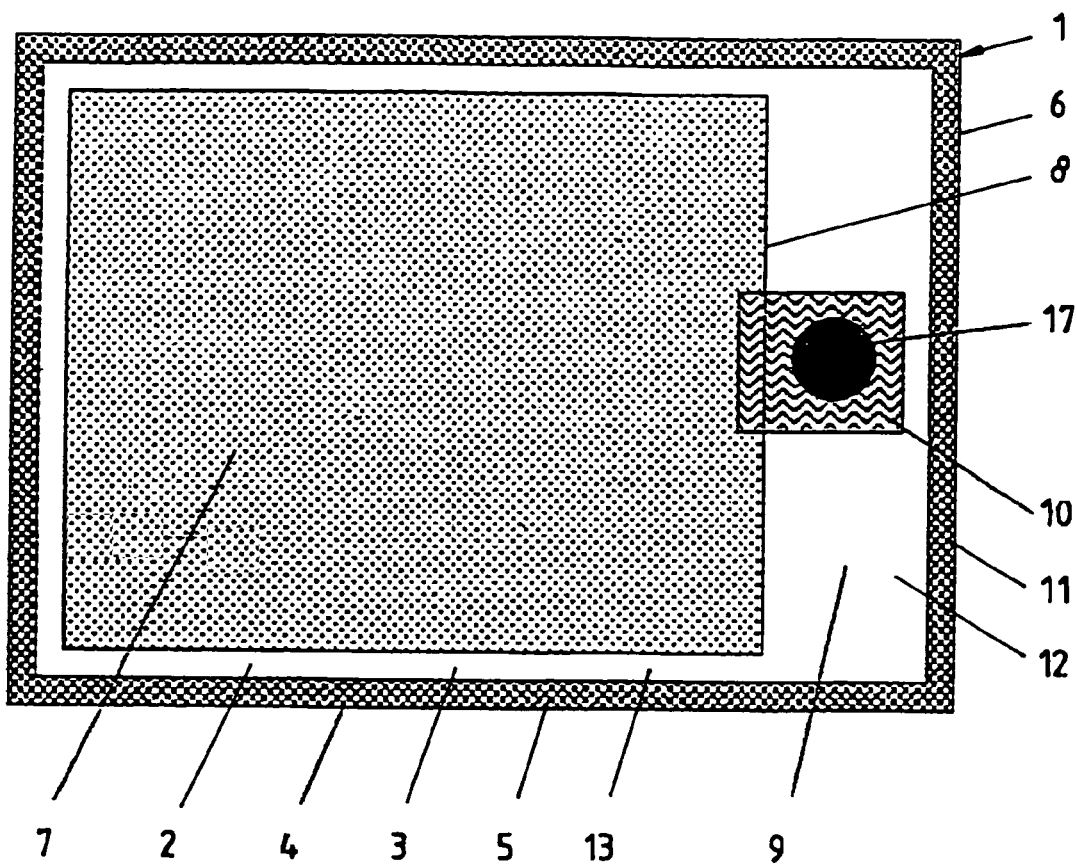
FIG. 1 is a cross section through the vacuum insulation panel according to the invention taken along its central base plane, with the measurement apparatus indicated.
Figure 2:
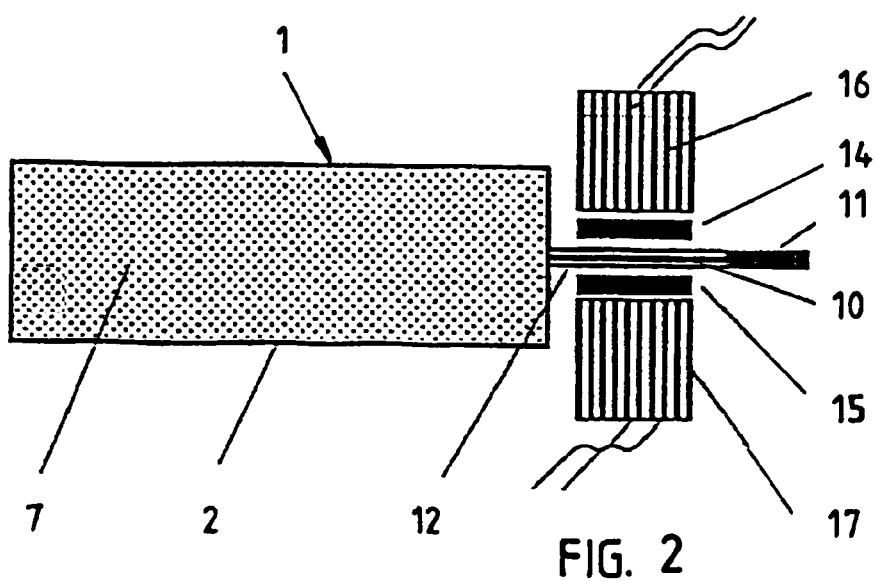
FIG. 2 is a section through FIG. 1 along line II-II.

To produce an evacuated body 1 in the form of a vacuum insulation panel, two high-barrier films 2 measuring 250 mm×450 mm and placed one on top of the other are made into a bag 3 by welding the two films 2 together via a respective sealing seam 5 run along each of three of the side margins 4. Through the still-open side 6 of the bag 3, a dried core panel 7 of microporous silica measuring 200 mm×300 mm×20 mm is inserted in the bag 3. Since the core plate 7 is much shorter than the length of the bag 3, after the core plate 7 has been inserted all the way, a wide free area 9 remains between its edge 8 and the open side 6 of the bag. A thin material layer, particularly a microglass fiber mat 10, is placed in this area, specifically in such a way that, on the one hand, at least approximately 10 to 20 mm overlap with the core panel 7 and, on the other hand, the sealing area 11 at the bag opening 6 remains empty. The dimensions of the mat 10 should be approximately 50 mm in width and 100 mm in length. The bag 3, with core panel 7 and mat 10, is evacuated in a vacuum chamber to a gas pressure of approximately 1 mbar and the final sealing seam 11 is closed. Wide area 9, which is occupied only (partially) by a mat 10, thus forms a flap 12 that is wider than the flaps 13 at the other side margins 4. Air is then let into the vacuum chamber and the vacuum insulation panel 1 is removed ready for installation.

This material layer 10 thermally separates the two film layers 2 from each other in the area of the wider flap 12. Thus, after the vacuum insulation panel 1 is completed, heat transfer through the wider flap 12 can be measured at the location where the mat 10 is present. Such measurements can then be used to determine the gas pressure inside the vacuum insulation panel 1. For reliability of measurement, the size of the measurement area on the thin material layer 10 should be approximately 5 to 10 cm$^2$. This also means that the thin material layer 10 must have a proportionate minimum size.

To determine the gas pressure, two heat flow meters 14, 15 serve to measure the heat transfer through the film flap 12. Each of the two heat flow meters 14, 15 is attached to a respective, for example plate-shaped, temperature regulated body 16, 17, preferably of metal. The two temperature regulated bodies 16, 17 are disposed opposite each other, and each carries a respective heat flow meter 14, 15 on its surface that faces the other.

To perform a measurement, the film flap 2 with a test mat 10 is placed between these two plate-shaped heat flow meters 14, 15 with the differently regulated bodies 16, 17, particularly metal bodies, facing away from each other, i.e., outward. Since the heat capacities of the two layers of the envelope films 2 of the flap 12 and of the thin mat 10 disposed between them are low, the heat flow rapidly attains a steady state.

Temperature sensors in the vicinity of both heat flow meters 14, 15 and/or (metal) bodies 16, 17 supply the temperature difference between the two heat flow meters 14, 15. The average of the heat flow from the two heat flow meters 14, 15 is used to determine the heat transfer coefficient of the film 2/test mat 10/film 2 system. From the known thickness of the thin material layer 10 and the also known thermal resistance of the two films 2, the thermal conductivity of the thin material layer 10 is then calculated. Finally, the known dependence of the thermal conductivity of the thin material layer 10 on the gas pressure, which can be determined via separate testing of the test matting 10, is used to arrive at the gas pressure inside the vacuum insulation panel 1.

Figure 3:
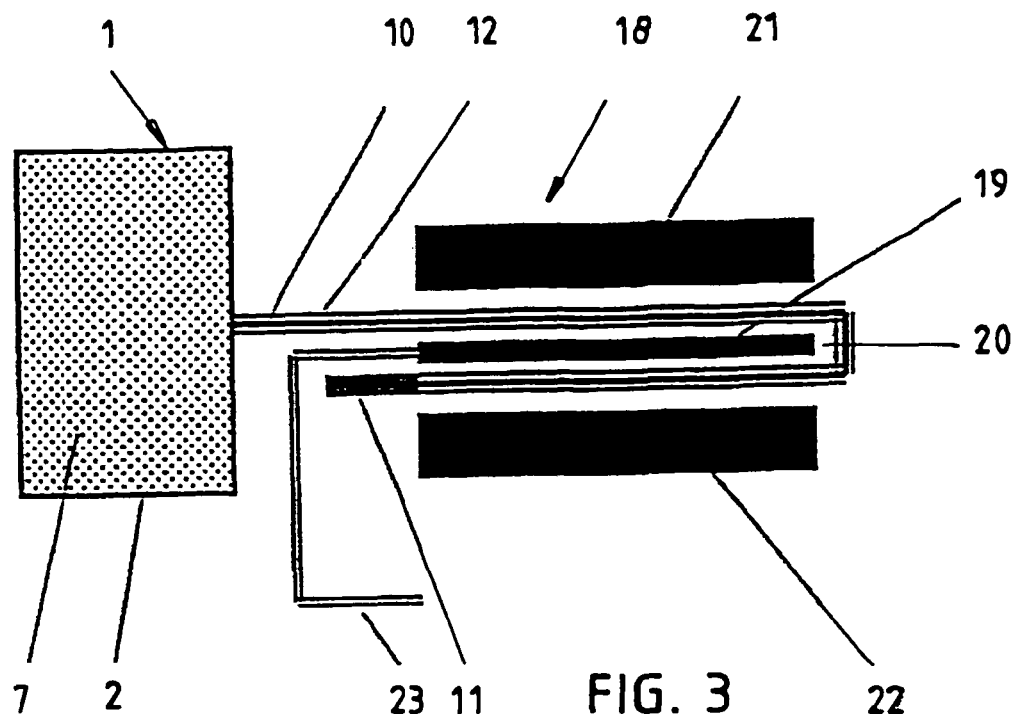
FIG. 3 is a depiction corresponding to FIG. 2 of a modified embodiment of the invention.

FIG. 3 shows a modified embodiment of the invention, in which the measuring head 18 consists only of a thin heating film 19 with a temperature sensor applied to it for heat regulation. For this purpose, a thermocouple wire is attached, for purposes of control and temperature measurement, to a heating film 19 approximately 30 mm in diameter. To perform a measurement, the wide flap 12 of the vacuum insulation panel 1, containing the glass fiber mat 10 as shown in FIG. 3, is folded around this heating film 19. On both outer faces of the pouch 20 created by the fold, disk-shaped magnets 21, 22 each about 30 mm in diameter and about 10 mm thick, serving as heat sinks, are mounted so that they attract each other and create good thermal contact with the film flap 12.

The electrical connectors 23 of the heating film 19 and of the temperature sensor are connected to a controller. The heating voltage of the heating film 19 is measured by a measuring instrument, particularly a digital multimeter, or is read into a computer (along with the temperature signal) by means of a converter.

In contrast to the first-described method, which requires only one film flap 12 typically about 30 mm wide, this case naturally calls for a projecting flap 24 with internal mat 25 that is at least twice as wide, and can be wrapped around the heating film 19.

The two outer faces of the films 2 are each [in] contact with a respective cooled metal plate in the form of the two magnets 21, 22. The thermal power from the heating film 19 now flows through both faces outward into the cooler outer face. The measured steady-state thermal power—referred to a temperature difference of 1 K—is, again, a measure of the level of the gas pressure in the vacuum panel 1.

To measure the heat transfer, first, the temperatures of the magnets 21, 22, of the film fold 20 with the interposed mat 10, and of the heating film 19 are allowed to reach equilibrium with one another and with the ambient temperature. At the beginning of measurement, the temperature of the heating film 19 is quickly regulated to a nominal temperature of about 70° C. Once the unsteady processes have subsided, the thermal power is read. At the end of the measurement, the heat is switched off again. The total duration of measurement is about 20 seconds.

The heating voltage measured at the end of the test is used to calculate the thermal power, based on the known resistance of the heating film 19. In the determination of the temperature difference between the heating film 19 and the external heat sinks 21, 22, their temperature is assumed to increase only slightly compared to the start time of the measurement. Alternatively, temperature sensors can be mounted on the heat sinks 21, 22 and their temperatures also measured at the end of the test period. The thus-determined heat transfer coefficient of the glass fiber mat 10 is converted to the gas pressure of the vacuum insulation panel 1 by means of a calibration function or a table.

Figure 4:
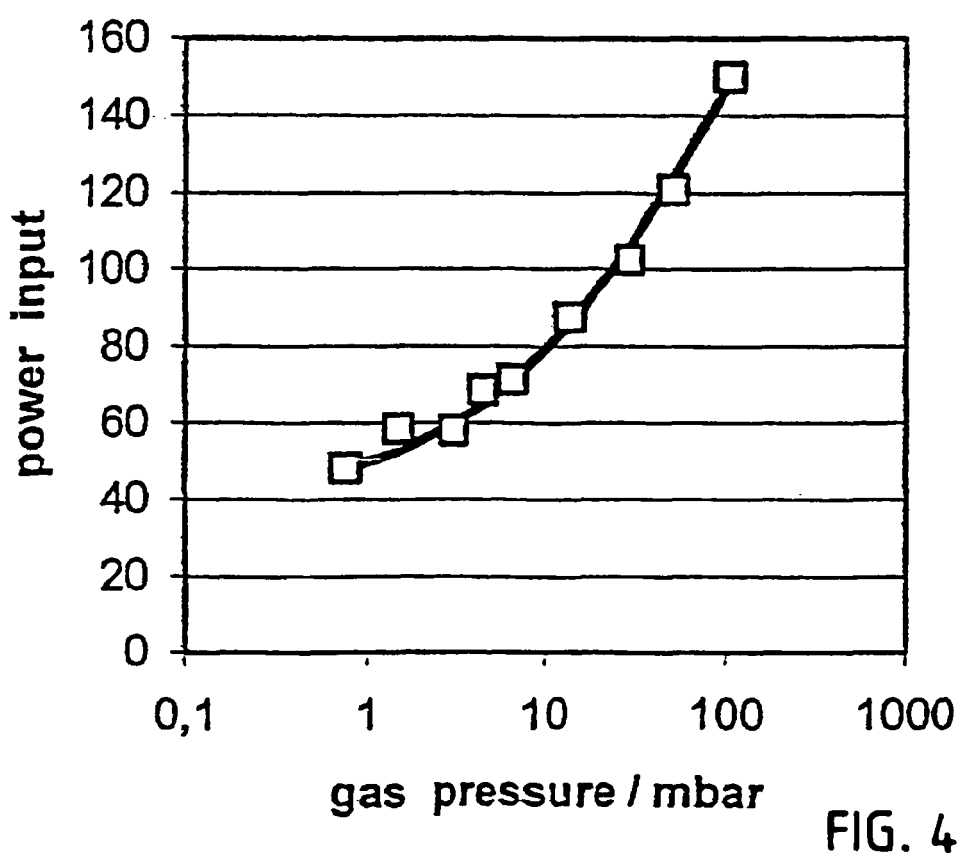
FIG. 4 shows the thermal power required to maintain a predetermined temperature difference, plotted against the gas pressure present in the vacuum insulation panel.

An example of a series of measurements used for calibration is represented in the graph of FIG. 4. In that model, for a microglass fiber mat 10 as an insert in a film flap 12, the power input to the heating film 19—normalized to the temperature difference of the heating film 19 versus the heat sinks 21, 22—was measured at different gas pressures. The particular gas pressure was determined separately by means of a gas pressure manometer. The continuous line is a fit function through the measurement points. Its inverse function can now be used to compute the gas pressure, in a range of 1 to 100 mbar, for a given measurement value.

The described arrangement is suitable for measuring the gas pressure even in vacuum insulation panels 1 that are permanently installed in an object. Only the heating film 19, with temperature sensor, and the two magnets 21, 22 remain on the vacuum insulation panel. The four lead wires 23 are connected to a suitable jack and are run so that they are accessible to the measurement apparatus from their locations on the object. In this fashion, the increase in gas pressure can be tracked within a range of 1 mbar to 100 mbar in selected individual vacuum insulation panels 1 for years to come.

The invention claimed is:

1. A method for determining gas pressure in an evacuated body having a film-like envelope, the method comprising the steps of:
   providing the body with a flap (12) disposed on the exterior of the body, the flap being formed by two film faces (2) joined together in a region of a free edge of the flap (12) and which define a gap that communicates with space inside the envelope of the body and is at least partially filled with an open-pored, thin material layer (10), and
   measuring the gas-pressure dependent heat transfer coefficient at at least one point on the material layer (10).

2. The method in accordance with claim 1, wherein the two film faces (2) defining the filled gap are exposed over their surfaces adjacent the gap to a differential pressure between an internal vacuum and an external atmospheric pressure.

3. The method in accordance with claim 1, wherein the heat transfer coefficient of the flap (12) is measured by means of
   (a) on one face of the flap (12), a first temperature regulated metal body (16, 17; 19, 21, 22), with an adjacent heat flow meter (14) that faces toward the flap (12), and
   (b) on another face of the flap (12), a second temperature regulated metal body (16, 17; 19, 21, 22) having a different temperature from the first body (16), and
   (c) an adjacent heat flow meter (15) that faces toward the flap (12).

4. The method in accordance with claim 3, wherein to measure heat flow, the two heat flow meters (14, 15) which are regulated to a particular nominal temperature, are brought into contact with the flap (12) from both sides of the film flap with measurement areas of the heat flow meters facing each other.

5. The method in accordance with claim 4 wherein the measurement process is continued until the heat flow attains a substantially steady state.

6. The method in accordance with claim 4, wherein an average of the two heat flow meters (14, 15) is used to determine the heat flow.

7. The method in accordance with claim 1, wherein the heat transfer coefficient of the flap is measured by only one body (16, 17; 21, 22) comprising a heat flow meter (14, 15).

8. The method in accordance with claim 3, wherein temperatures of at least one heat flow meter (14, 15) and of at least one temperature regulated body (16, 17; 21, 22) are detected by means of temperature sensors in contact with the heat flow meter (14, 15) and the temperature regulated body (16, 17; 21, 22).

9. The method in accordance with claim 3, wherein the metal body (16, 17; 21, 22) comprises a heating film (19) whose electrical power is a measure of the heat transfer coefficient of the flap (12) and which is surrounded by a guard ring.

10. The method in accordance with claim 3, wherein the two metal bodies (16, 17), are disposed opposite each other, each on a respective one of the two faces of said flap (12), and are maintained at different temperatures.

11. The method in accordance with claim 3, wherein thermal contact between the flap (12) and the two bodies (16, 17; 21, 22) disposed on different of the flap (12) is brought about by magnetic attraction forces occurring between mutually facing, contrary magnetic poles in the region of the two bodies (16, 17; 21, 22).

12. The method in accordance with claim 7, wherein the body (16, 17; 19, 21, 22) is heated and regulated to a substantially constant temperature by means of at least one heating element.

13. The method in accordance with claim 12, wherein the body (16, 17; 19, 21, 22) is cooled by means of a selected one of a cooling device, a heat exchanger, a fan, and natural convection, and is maintained at a constant temperature near ambient or therebelow.

14. The method in accordance with claim 1, wherein the flap (12) material layer (10) is folded once by about 180°.

15. The method in accordance with claim 14, wherein a film heating element (19) comprising a temperature sensor is placed within the fold of the folded film flap (12) with liner (10), and on each outer face of the folded flap (12) is placed a cooling body (16, 17; 21, 22) that has a lower temperature than the film heating element (19) and is disposed generally opposite the film heating element (19).

16. The method in accordance with claim 15, wherein thermal contact between the flap (12), and the two cooling bodies (16, 17; 21, 22) disposed on different outer faces of the film flap (12), is brought about by magnetic attraction forces occurring between mutually facing, contrary magnetic poles in the region of the two cooling bodies (16, 17; 21, 22).

17. The method in accordance with claim 16, wherein the film heating element (19) regulated to a nominal temperature is placed within the fold (20) of the folded flap (12), the cooling bodies (16, 17; 21, 22) are brought into contact with the film flap (12) on both sides thereof, and time-varying thermal power is tracked until a generally steady value is reached.

18. The method in accordance with claim 1, wherein a measuring element comprising a heating film (19), a temperature sensor, and cooling bodies (16, 17; 21, 22) is permanently disposed at/in said flap (12).

19. The method in accordance with claim 9, wherein after the beginning of measurement of the heat transfer coefficient, the heating film (19) is heated from an ambient temperature to a nominal temperature, and the thermal power is input and measured until the heat flow reaches a substantially steady value.

20. The method in accordance with claim 19, wherein to determine the heat transfer coefficient through the flap (12),
a) a heating film (19) comprising a temperature sensor is placed on the evacuated body near the flap (12),
b) the flap (12) filled with a thin material layer (10) is laid thereover,
c) a cooling body (16, 17; 21, 22) is placed thereon, and
d) the thermal power of the film (19) is measured until a predetermined temperature is reached and held constant.

21. The method in accordance with claim 20, wherein the heating film (19), provided with a magnetic or magnetizable disk, and the cooling body (16, 17; 21, 22), equipped with a magnet, attract each other by magnetic force, thereby creating a thermal contact between the flap (12) and the cooling body (16, 17; 21, 22), and between the flap (12) and the heating film (19).

22. The method in accordance with claim 15, wherein the heating film (19), by electrical connectors (23), and the cooling body (16, 17; 21, 22) remain permanently on the vacuum insulation panel (1) and the heating film (19) is heated to a nominal temperature only to perform a measurement.

23. The method in accordance with claim 1, wherein to determine the heat transfer coefficient through the flap (12) together with the inserted porous material layer (10), the measured heat flow is divided by the temperature difference between the two faces of the flap (12).

24. The method in accordance with claim 1, wherein a mathematical relationship between the heat transfer coefficient and the gas pressure is derived from measurements performed with a known gas pressure.

25. A system for determining by means of a thermal measurement method gas pressure in an evacuated body (1) on whose exterior is configured a flap (12) delimited by two film faces (2) that are joined together (5, 11) in a region of a free edge (4, 6) of said flap (12), the system comprising:
a) a space (9) formed by said two film faces (2) of said flap (12) the space being in communication with a space inside said body (1) and at least partially filled with an open-pored, thin material layer (10), and
b) a device (14-17; 18, 19, 21, 22) for measuring a gas-pressure-dependent heat transfer coefficient of said flap (12) at the location of said material layer (10).

26. The system in accordance with claim 25, wherein said film faces (2) defining the space (9) are arranged so as to be exposed over substantially their entire surfaces adjacent said space (9) to differential pressure between the internal vacuum of the space (9) and an external pressure.

27. The system in accordance with claim 25 wherein said film (2) of said flap (12) comprises a stainless steel film having a thickness of no more than 0.5 mm and a thickness of no more than 0.2 mm.

28. The system in accordance with claim 25, wherein said flap (12) comprises at least one of a high-barrier film, and an aluminum composite film.

29. The system in accordance with claim 25, wherein said evacuated body (1) comprises a pressure-resistant vacuum insulation panel.

30. The system in accordance with claim 25, wherein said thin material layer (10) comprises an area that is 0.5 $cm^2$ to 100 $cm^2$ in size.

31. The system in accordance with claim 25, wherein said thin material layer (10) lies crease- and wrinkle-free within the area.

32. The system in accordance with claim 25, wherein said thin material layer (10) comprises a selected number of individual layers.

33. The system in accordance with claim 25, wherein said thin material layer (10) is in communication with the space inside the body element and with an insulating core, such that the same gas pressure exists in said insulating core as in said material layer (10).

34. The system in accordance with claim 25, wherein said open-pored, thin material layer (10) presents a difference in heat transfer coefficients between a maximum value at atmospheric pressure and a minimum value under vacuum of no more than 10 mbar.

35. The system in accordance with claim 25, wherein the thickness of said material layer (10) is 0.05 mm and 5 mm.

36. The system in accordance with claim 25, wherein said open-pored, thin material layer (10) comprises a matting made of a selected one of organic or inorganic fibers, and a fabric made of organic or inorganic fibers, and an organic or inorganic foam layer, and an organic or inorganic aerogel layer, and an organic or inorganic powder, and a paper.

37. The system in accordance with claim 25, wherein said open-pored, thin material layer (10) comprises a selected one of a glass fiber matting, and a synthetic fiber matting having a weight per unit area of between 10 g/m² and 500 g/m².

38. The system in accordance with claim 25, comprising at least one measuring head (14-17; 18, 19, 21, 22) comprising at least one temperature regulatable body (16, 17; 19, 21, 22) having a surface that is adapted to be placed against a surface region of the flap (12) of the vacuum element (1) to be tested.

39. The system in accordance with claim 38, wherein the measuring head (14-17; 18, 19, 21, 22) comprises at least one heat flow meter (14, 15), disposed at a surface to be placed against said flap (12).

40. The system in accordance with claim 38 wherein the system further comprises a further measuring head (14-17; 18, 19, 21, 22), comprising a temperature regulatable body (16, 17; 19, 21, 22) equipped with a heat flow meter (14, 15), and having a contact surface adapted to be placed against a further surface region of the flap (12) of the vacuum element (1) under test.

41. The system in accordance with claim 40, wherein said temperature regulatable bodies (16, 17; 19, 21, 22) of said two measuring heads (14-17; 18, 19, 21, 22) have different temperatures.

42. The system in accordance with claim 40, further comprising a device for imposing the different temperatures on said temperature regulatable bodies (16, 17; 19, 21, 22) of said two measuring heads (14-17; 18, 19, 21, 22).

43. The system in accordance with claim 40, further comprising a device for determining an average of the measurement signals from two heat flow meters (14, 15).

44. The system in accordance with claim 40, wherein one or more temperature sensors are operative to detect temperatures of selected ones of said temperature regulated bodies (16, 17; 19, 21, 22) and said heat flow meters (14, 15), and standing in direct contact with the relevant body (16, 17; 19, 21, 22) or heat flow meter (14, 15).

45. The system in accordance with claim 39, wherein at least one body (16, 17; 19, 21, 22) comprises a heating film (19), whose electrical power is a measure of the heat transfer coefficient of said flap (12) and which is surrounded by a guard ring of the same temperature.

46. The system in accordance with claim 45, wherein disposed opposite the one body (16, 17; 19, 21, 22) located on one side of said flap (12) is a selected body (16, 17; 19, 21, 22), comprising a metal plate, located on a second side of said flap (12) and which is maintained at a temperature that is uniform and different from that of said first body (16, 17; 19, 21, 22).

47. The system in accordance with claim 46, wherein the two bodies (16, 17; 19, 21, 22) disposed on different sides of said film flap (12) attract each other magnetically, to effect thermal contact between said film flap and said measuring heads (14-17; 18, 19, 21, 22) resting each against a respective one of the two sides of said film flap.

48. The system in accordance with claim 47, wherein at least one body (16, 17; 19, 21, 22) is adapted to be coupled to at least one heating element (19) in order to regulate the temperature.

49. The system in accordance with claim 48, wherein the at least one body (16, 17; 19, 21, 22) is adapted to be coupled to at least one cooling device comprising a selected one of a Peltier element, a heat exchanger a fan, and cooling fins for natural convection, in order to maintain the body at a temperature near or below ambient temperature.

50. The system in accordance with claim 25, wherein said film flap (12) comprising said material layer (10) is folded at least once by more than 90°.

51. The system in accordance with claim 50, wherein a film heating element (19) comprising a temperature sensor is placed within a fold (20) of the folded film flap (12) together with said material layer (10).

52. The system in accordance with claim 51, wherein a cooling body (21, 22) having a lower temperature than said film heating element (19), is placed against at least one of the outer faces of said film flap (12).

53. The system in accordance with claim 52, wherein said cooling bodies (21, 22) are magnetically attracted to the outer faces of said film flap (12).

54. The system in accordance with claim 52, wherein a measuring element, comprising a selected one of the heating element (19), a temperature sensor and cooling bodies (21, 22), remains in contact with said film flap (12).

55. The system in accordance with claim 52, wherein to determine the heat transfer coefficient through said flap (12),
a) said heating element (19) comprises a temperature sensor disposed on said evacuated body (1) in a vicinity of an edge (4, 6) thereof,
b) said flap (12) filled with the thin material layer (10) is disposed thereover, and
c) the cooling body (21, 22) is disposed thereon.

56. The system in accordance with claim 52, wherein said heating element (19) provided with a magnetic disk, and said cooling body (21, 22), equipped with a magnet, attract each other by magnetic force, thereby producing thermal contact between said flap (12) and said cooling body (21, 22), and between said flap (12) and said heating film (19).

57. The system in accordance with claim 54, wherein said heating film (19) by electrical connectors (23) is permanently proximate said vacuum element (1) and is heated only to perform a measurement.

58. The system in accordance with claim 57, wherein a cooling device remains permanently proximate said vacuum element (1).

* * * * *